United States Patent Office 3,481,947
Patented Dec. 2, 1969

3,481,947
PREPARATION OF 2-(2'-THIAZOLYL)-
BENZIMIDAZOLES
Brian Colwell Ennis, Mount Waverley, Victoria, Australia, assignor to Monsanto Chemicals (Australia) Limited, Victoria, Australia, a company of Victoria, Australia
No Drawing. Filed Sept. 18, 1967, Ser. No. 668,635
Claims priority, application Australia, Sept. 19, 1966, 11,208/66
Int. Cl. C07d 99/10
U.S. Cl. 260—302                 10 Claims

ABSTRACT OF THE DISCLOSURE 2-(2'-thiazolyl)-benzimidazoles of the structural formula:

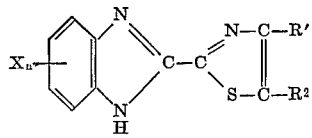

wherein $n$ is an integer from 0 to 2; X denotes a substituent selected from halogen, hydroxy, acyloxy, alkyl, alkoxy, alkylthio, haloalkyl, nitro, amino, acylamino, alkylamino and dialkylamino, are prepared by the aromatization of the corresponding 2-(2'-thiazolin-2'-yl)-benzimidazoles, by heating the latter with a metal dehydrogenating catalyst in a solvent. The compounds so obtained exhibit biological toxicant activity, more particularly anthelmintic activity.

This invention relates to the preparation of 2-(2'-thiazolyl)-benzimidazoles of the structural formula:

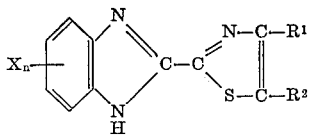

wherein $n$ is an integer from 0 to 2 inclusive; X is selected from the group consisting of halogen, hydroxy, acyloxy of not more than four carbon atoms, alkyl of not more than four carbon atoms, alkoxy of not more than four carbon atoms, alkylthio of not more than four carbon atoms, haloalkyl of not more than four carbon atoms, nitro, amino, acylamino of not more than four carbon atoms, alkylamino of not more than four carbon atoms and dialkylamino wherein each alkyl is of not more than four carbon atoms; and $R^1$ and $R^2$ are each selected from the group consisting of hydrogen and alkyl of not more than four carbon atoms. Preferably X is in the 5-position or the 5,6-positions of the ring.

Compounds of the above formula are known to be useful as biological toxicants, more particularly as anthelmintics. Said compounds can be prepared by the method which consists in reacting the thiazolyl acid or derivative thereof, with a compound of the structural formula:

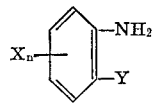

wherein $n$ and X are as defined above, and wherein Y is selected from nitro, amino and substituted amino radicals.

Alternative methods described for the preparation of said 2-thiazolyl benzimidazole compounds include reacting together o-phenylene-diamine with a thiazolyl aldehyde compound, or, the condensation of the thiazolyl aldehyde with a compound of Formula II above.

In accordance with the present invention, the 2-thiazolyl benzimidazole compounds of Formula I above are prepared by the aromatization of 2-(2'-thiazolin-2'-yl)-benzimidazoles to produce the corresponding 2-(2'-thiazolyl)-benzimidazoles. This process has the advantages of being simple and more economic than the previously described processes, the 2-(2'-thiazolin-2'-yl)-benzimidazole reactants being relatively inexpensive and commercially available. The process has a further advantage in that both solvent and catalyst used in the process as hereinafter described can be recovered and re-used.

Thus, in accordance with the invention, 2-(2'-thiazolyl)-benzimidazoles of Formula I above are prepared by the aromatization of the corresponding 2-(2'-thiazolin-2'-yl)-benzimidazole, by refluxing the latter with a metal dehydrogenating catalyst in a suitable solvent, as illustrated by the following equation:

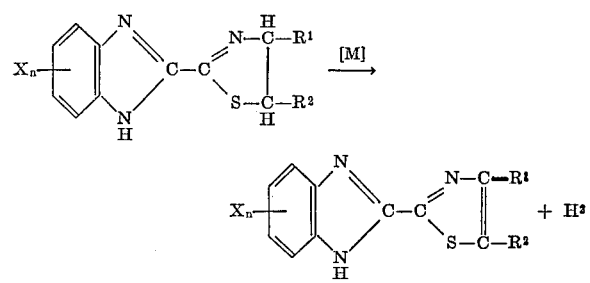

where $n$, X, $R^1$ and $R^2$ are as defined above; and wherein M is the metal dehydrogenating catalyst. Suitable catalysts for the purposes of the present process are those of the platinum family, consisting of ruthenium, rhodium, palladium, osmium, iridium, and platinum. The solvent should have a boiling point at least within the operating temperature range of the process, which generally is conducted at a temperature within the range 180–280° C., and should be such that the selected reactant is sufficiently soluble therein.

The catalyst preferably is supported on an inert carrier of charcoal, asbestos, alumina, pumice, kieselguhr, or the like, in the form of pellets or granules. The preferred catalyst system is palladium-on-charcoal as it is both efficient and inexpensive. Typical examples of aromatic hydrocarbons and ethers which are suitable as the solvent for process of the invention are n-butyl benzene; 1,2-diethyl benzene; naphthalene; diphenyl; diphenylmethane; 1,1-di-p-tolylethane; 1,2-di-p-tolylethane; n-butyl phenyl ether; isobutyl phenyl ether; isoamyl phenyl ether; ethyl benzyl ether; ethyl o-tolyl ether; methyl beta-naphthyl ether; diphenyl ether; phenyl benzyl ether and dibenzyl ether. The preferred solvent is diphenyl ether since it is commercially available and has a sufficiently high boiling point (259° C.) to enable it to be used as the solvent in most instances within the operating temperature range (180–280° C.) of the process. Typical examples of the benzimidazole reactant used in the process of the invention are 2-(2'-thiazolin-2'-yl)-benzimidazole; 2-(2'-thiazolin-2'-yl)-5,6-dimethyl-benzimidazole; 2-(2'-thiazolin-2' - yl) - 5 - chlorobenzimidazole; 2-(2'-thiazolin-2'-yl)-5- methoxybenzimidazole; and 2-(4'-methyl-2'-thiazolin-2'-yl)-benzimidazole.

In general in operating the process of the invention, the 2-(2'-thiazolin-2'-yl)-benzimidazole reactant, together with the dehydrogenating catalyst, is heated under reflux in the solvent, under an inert atmosphere. The temperature necessary for reaction varies with the particular 2-(2'-thiazolin-2'-yl)-benzimidazole reactant, however, suitable reaction conditions can be achieved at temperatures within the range 180–280° C., as indicated above. At the lower end of this range, the reaction times are excessive, while above the upper limit of the range, decomposition of the reactant material and product can occur, besides poisoning of the catalyst. The preferred temperature range is 220–250° C.

The amount of catalyst employed in the process of the invention varies with the catalyst system used. At low concentrations the reaction times are excessively prolonged, whereas catalyst usage at high concentrations is uneconomic. With the preferred catalyst system of palladium-on-charcoal, which can be used in the conveniently available commercial form of 5% by weight palladium-on-charcoal, the minimum practical catalyst system concentration is about 1% by weight of the reactant material, the upper limit being set by economic considerations at about 10%. The preferred concentration is 4–6% by weight of the reactant material.

Highly satisfactory reaction conditions are achieved if the weight of reactant material per volume of solvent is of the order of twice the solubility limit at the reaction temperature. In the case of 2-(2'-thiazolin-2'-yl)-benzimidazole reactant in diphenyl ether, a mixture of about 150 g. of the benzimidazole reactant per litre of diphenyl ether is suitable. This ratio can be varied considerably without detrimental effects on the reaction, however, a large excess of solvent would result in higher product recovery costs, while insufficient solvent would result in premature precipitation of the end product, resulting in entrainment of the precipitate with the catalyst system during the filtration stage hereinafter indicated for recovery of the end product. Insufficient solvent would also result in prolonged reaction times, due to the limited solubility of the benzimidazole and the need for the reactant to be dissolved.

Reaction time, as suggested above, is closely related to reaction temperature, and to a lesser extent, also related to the catalyst concentration. Reaction times can vary as widely as 10–50 hours, but, when operating within the preferred ranges of reaction variables, a reaction time of from 25–30 hours is usual. When the reaction is completed, as may conveniently be determined by I.R. or U.V. analysis, the reaction mixture is filtered hot to remove the catalyst. The desired 2-(2'-thiazolyl)-benzimidazole is then precipitated from the cooled filtrate, and isolated and purified by conventional procedures.

The following practical example is illustrative and not limitative of the process of the invention:

Example 1

2-(2'-thiazolin-2'-yl)-benzimidazole (75.0 g.) and 5% palladium-on-charcoal (7.5 g.) were heated at 220–230° C. under reflux in diphenyl ether (500 ml.), using a nitrogen atmosphere, the mixture being stirred continuously. When the reaction had ceased, as indicated by I.R. analysis, the reaction time being 32 hours, the reaction mixture was filtered hot to remove the catalyst. The reaction liquor was cooled to about 30–35° C. to precipitate yellow crystals of 2-(2'-thiazolyl)-benzimidazole, which was separated and washed with cyclohexane to give 40.5 g. of substantially pure product. An equal quantity of cyclohexane was added to the filtrate to precipitate a further 16.4 g. of the product, the total yield being 76.9%.

The 2-(2'-thiazolin-2'-yl)-benzimidazole reactants can be prepared by the method which comprises reacting a 2-trichloromethylbenzimidazole with a β-mercaptoalkylamine, as illustrated in the following equation:

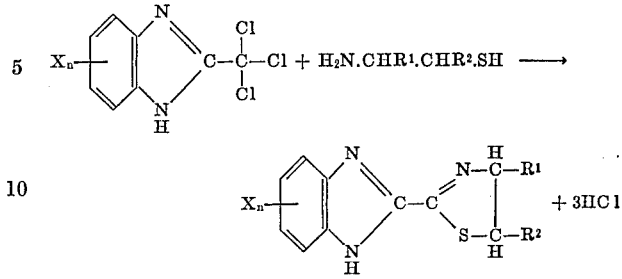

wherein $n$, X, $R^1$ and $R^2$ are as defined above. Thus, 2-trichloromethylbenzimidazole reacts spontaneously on mixing with an excess of β-mercaptoethylamine at room temperature to give 2-(2'-thiazolin-2'-yl)-benzimidazole in high yield.

An inert diluent or solvent, such as 1,2-dimethoxyethane or ethyl acetate or an alcohol, may be used in carrying out the preparation of said compounds in order to give a more easily controlled reaction. The β-mercaptoethylamine may be conveniently used as the hydrochloride, the free base being generated in situ by the addition of a base such as a sodium alkoxide, or a tertiary amine. The order of mixing the reagents, or the molar proportion of the reagents, is not critical, however, an excess of the amine can be employed to neutralize the hydrogen chloride formed in the reaction. The reaction temperature is preferably held as low as possible in order to minimize the extent of side reactions. The optimum temperatures vary appreciably with the nature of the substituents $R^1$ and $R^2$, but is in general of the order of 20–80° C. The reaction product is separated from solvent and amine hydrochloride by conventional means.

Preparation of said reactants is illustrated in the following non-limitative practical examples:

Example 2

2-(2'-thiazolin-2'-yl)-benzimidazole was prepared as follows: 2-mercaptoethylamine hydrochloride (1.1 g.) was added to a solution of sodium (0.92 g.) in ethanol. 2-trichloromethylbenzimidazole (2.3 g.) was added to this solution at room temperature when an exothermic reaction set in. The product was collected after 1 hour, washed with water, and recrystallized with ethanol to give 2-(2'-thiazolin-2'-yl)-benzimidazole as plates, M.P. 292–294° C. (d). Found: C, 59.1; H, 4.5; N, 20.2; S, 16.2. $C_{10}H_9N_3S$ requires: C, 59.1; H, 4.5; N, 20.7; S, 15.8%.

The mercaptoalkylamine component used in Example 2 may be prepared in situ by reaction of alkylene imine and hydrogen sulfide according to known procedure, and the reaction product then reacted with the 2-trichloromethylbenzimidazole component to produce compounds in accordance with the invention, as illustrated in Example 3 as follows:

Example 3

2-(2'-thiazolin-2'-yl)-benzimidazole was prepared as follows: ethylene imine (4.3 g.) in ethanol (40 mls.) was added to a solution of ethanol (40 mls.), saturated with hydrogen sulfide by blowing hydrogen sulfide into the solution at 0° C. over ½ hour. After a further 15 minutes the hydrogen sulfide was turned off (total $H_2S$ usage 6 g.) and the vessel purged with nitrogen. 60 mls. of the ethanol was distilled from the mixture, the flask cooled to 20° C. and 60 mls. of water added. 2-trichloromethylbenzimidazole (10 g.) was added over 15 minutes with cooling below 50° C., the reaction was held for 2 hours, at 50° C., during this time 40% NaOH solution (7 mls.) was added to keep the reaction alkaline to phenolphthalein. The solid was filtered, washed with water and dried. The yield of pure 2-(2'-thiazolin-2'-yl)-benzimidazole M.P. 285° C. was 7.1 g. (82%).

Example 4

5-methyl-2-(2'-thiazolin-2'-yl)-benzimidazole was prepared as follows: 5-methyl-2-trichloromethyl benzimidazole (1.0 g.) and mercaptoethylamine hydrochloride (0.5 g.) in chloroform (15 ml.) were treated with triethylamine (1.6 g.) in chloroform. There was a transient red coloration during the addition of the base and the final reaction mixture was alkaline. The reaction mixture was evaporated to dryness on a steam bath and the residue washed with water before recrystallization from cyclohexane and from carbon tetrachloride to give colorless needles, M.P. 206–7° C., of 5-methyl-2-(2'-thiazolin-2'-yl)-benzimidazole (0.7 g., ca. 90%). Found: C, 60.8; H, 5.2; N, 19.0. $C_{11}H_{11}N_3S$ requires: C, 60.8; H, 5.1; N, 19.4%.

The 2-trichloromethyl benzimidazoles used in the preparation of the 2-(2'-thiazolin-2'-yl)-benzimidazole reactants can be prepared by the reaction of a mono-salt of an appropriately substituted o-phenylenediamine with an alkyl trichloroacetimidate, as illustrated in the following equation:

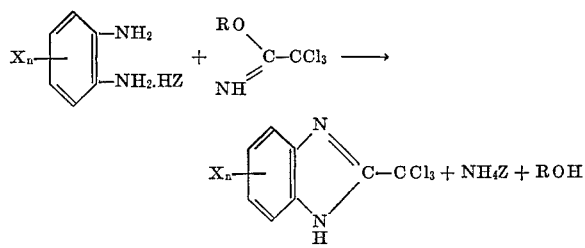

wherein $n$ and X are as defined above, wherein Z denotes the radical of a mineral acid, preferably hydrochrolic acid or sulfuric acid, and wherein R denotes an alkyl group, preferably having not more than four carbon atoms. The two components are mixed together, conveniently in a suitable solvent or diluent. Suitable solvents are ethers, such as dioxan, diethyl ether, 1,2-dimethoxyethane; esters, for example, ethyl acetate; and alcohols such as methanol or ethanol. The convenient procedure is to add the alkyl trichloroacetimidate gradually to a solution or suspension of the phenylenediamine salt. The preferred temperature of reaction and the duration of reaction varies appreciably with the nature of the nuclear substituents denoted by X. Electron-donating groups such as alkyl and alkoxy favor the reaction, which then occurs readily at room temperature, in some cases cooling being required as the reaction is exothermic. On the other hand, electron-attracting groups such as halogen retard the reaction and a temperature of 40–50° C. is required for the reaction to be complete within a satisfactory time. The reaction product is isolated and purified by conventional procedure.

Preparation of said 2-trichloromethyl benzimidazoles is illustrated in the following non-limitative practical examples:

Example 5

Methyl trichloroacetimidate (0.1 mole) was added to a solution of o-phenylenediamine hydrochloride (0.1 mole) in dry methanol (150 ml.). An exothermic reaction occurred and a solid began to precipitate in half an hour. The reaction was completed in about 2 hours when the mixture was poured into water to give 2-trichloromethyl benzimidazole in 85% yield. This white crystalline solid was recrystallized from glacial acetic acid, dioxan, xylene or chloroform. The material had no melting point up to 360° C. and was identified by infra red (C-Cl peak at 820 cm.$^{-1}$ and ultra violet spectra max. at 284 and 224 m$\mu$) with the following microanalytical figures. Found: C, 40.5; H, 2.4; N, 12.2; Cl, 45.5%. $C_8H_5Cl_3N_2$ requires: C, 40.8; H, 2.1; N, 11.8; Cl, 45.2%.

The methyl trichloroacetimidate starting material can be prepared from trichloroacetonitrile and methanol in the presence of anhydrous potassium carbonate by the method of Cramer, Ber., 1958, 91, 1049. The product so prepared was obtained in 90% yield and had B.P. 148° C., $n_D^{25}$ 1.4785, $d_{25}$ 1.45.

Example 6

4-chloro-o-phenylenediamine monohydrochloride (0.02 mole) was reacted with methyl trichloroacetimidate (0.02 mole) by allowing them to stand overnight in dry methanol at room temperature. This mixture on quenching gave crude 2-trichloromethyl-5(6)-chlorobenzimidazole in 55% yield with 5% contaminate. The latter was removed by dissolving the mixture in acetic acid, filtration of the insoluble contaminate and aqueous quenching to give the desired compound. Several recrystallizations from xylene gave an analytically pure white crystalline material, M.P. 235° C. (I.R. spectrum aliphatic C-Cl 820 cm.$^{-1}$; aromatic C-Cl 810 cm.$^{-1}$). Found: C, 36.1; H, 1.8; N, 10.4; Cl, 52.3%; $C_8H_4Cl_4N_2$ requires: C, 35.7; H, 1.5; N, 10.4; Cl, 52.4%.

The 4-chloro-o-phenylenediamine monohydrochloride starting material can be prepared from the purified base by addition of hydrochloric acid in methanol and precipitation of the salt with petroleum ether.

Example 7

Methyltrichloroacetimidate (0.01 mole) was added to a suspension of 4,5-dimethyl-o-phenylenediamine monohydrochloride (0.01 mole) in dimethoxyethane (80 mls.). No apparent reaction took place and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl-5,6-dimethylbenzimidazole in 35% yield. The crude material was recrystallized three times from benzene to give a white crystalline material having M.P. 190° C. After 4 hours drying at 80° C. under vacuum, analysis showed the material to contain ⅓ molecule of benzene of crystallization. Found: C, 50.5; H, 3.8; N, 9.5; Cl, 36.9%. $C_{10}H_9N_2Cl_3 \cdot ⅓ C_6H_6$ requires: C, 49.8; H, 3.8; N, 9.6; Cl, 36.8%.

After further two recrystallizations from benzene the material with M.P. 190° C. was dried for four hours at 100° C. under vacuum. Analysis showed that it now contained ⅙ molecule of benzene of crystallization. Found: C, 47.6; H, 3.7; N, 10.1; Cl, 38.7%. $C_{10}H_9N_2Cl_3 \cdot ⅙ C_6H_6$ requires: C, 47.7; H, 3.7; N, 10.1; Cl. 38.5%.

The 4,5-dimethyl-o-phenylenediamine monohydrochloride starting material can be prepared by the addition of hydrochloric acid to the base dissolved in ethyl acetate, followed by precipitation of the salt with petroleum ether. This starting material has a M.P. 225° C. and has only slight solubility in the usual solvents.

Example 8

Methyltrichloroacetimidate (26.0 g., 0.15 mole) was added to a solution of 3,4-diaminotoluene hydrochloride (24.0 g., 0.15 mole) in 1,2-dimethoxyethane (400 mls.) at room temperature, and left overnight. Ammonium chloride was then filtered off and petroleum ether (B.P. 40–60° C.) was added to the filtrate to precipitate by-products. These were filtered off and the solution was evaporated to give 5-methyl-2-trichloromethyl benzimidazole in 60% yield. After recrystallization from benzene, the solid had M.P. 187° C. Found: C, 42.9; H, 2.9; N, 11.0%. $C_9H_7N_2Cl_3$ requires: C, 43.2; H, 2.8; N, 11.2%.

While this invention has been described with reference to various specific examples and embodiments, it is to be understood that the invention is not limited thereto.

The embodiments of the invention in which an exclusive property or privilege is claimed are defined as follows:

1. A process for the preparation of 2-(2′-thiazolyl)-benzimidazole of the formula

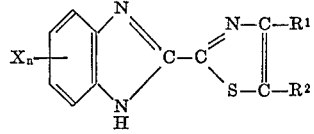

wherein $n$ is an integer from 0 to 2 inclusive; wherein each X is selected from the group consisting of halogen, hydroxy, acyloxy of not more than four carbon atoms, alkyl of not more than four carbon atoms, alkoxy of not more than four carbon atoms, alkylthio of not more than four carbon atoms, haloalkyl of not more than four carbon atoms, nitro, amino, acylamino of not more than four carbon atoms, alkylamino of not more than four carbon atoms and dialkylamino wherein each alkyl is of not more than four carbon atoms; and wherein $R^1$ and $R^2$ are each selected from the group consisting of hydrogen and alkyl of not more than four carbon atoms; which comprises heating at a temperature within the range of about 180° C. to about 280° C. a 2-(2′-thiazolin-2′-yl)-benzimidazole of the formula

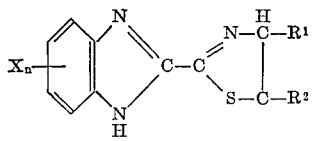

wherein $n$, X, $R^1$ and $R^2$ are as defined above, in a solvent and in the presence of a metal catalyst selected from the group consisting of ruthenium, rhodium, palladium, osmium, iridium and platinum.

2. A process in accordance with claim 1 wherein the 2-(2′-thiazolin-2′-yl)-benzimidazole and the metal catalyst are refluxed in a solvent selected from the group consisting of aromatic hydrocarbon and ether under an inert atmosphere.

3. A process in accordance with claim 1 wherein the solvent is selected from the group consisting of n-butylbenzene; 1,2-diethylbenzene; naphthalene; diphenyl; diphenylmethane; 1,1-di-p-tolylethane; 1,2-di-p-tolylethane; n-butyl phenyl ether; isobutyl phenyl ether; isoamyl phenyl ether; ethyl benzyl ether; ethyl o-tolyl ether; methyl beta-naphthyl ether; diphenyl ether; phenyl benzyl ether and dibenzylether.

4. A process in accordance with claim 1 wherein $n$ is 1 and X is in the 5-position of the ring.

5. A process in accordance with claim 1 wherein $n$ is 2 and X is in the 5 and 6-positions of the ring.

6. A process in accordance with claim 1 wherein the 2-(2′-thiazolin-2′-yl)-benzimidazole is selected from the group consisting of 2-(2′-thiazolin-2′-yl)-benzimidazole;
2-(2′-thiazolin-2′-yl)-5,6-dimethylbenzimidazole;
2-(2′-thiazolin-2′-yl)-5-chlorobenzimidazole;
2-(2′-thiazolin-2′-yl)-5-methoxybenzimidazole; and
2-(4′-methyl-2′-thiazolin-2′-yl)-benzimidazole.

7. A process in accordance with claim 1 wherein the metal catalyst is present as a catalyst system wherein the metal is supported on an inert carrier selected from the group consisting of charcoal, asbestos, alumina, pumice and kieselguhr, the catalyst system consisting of about 5% metal by weight.

8. A process in accordance with claim 7 wherein the catalyst system concentration is from about 1 to about 10% by weight of the 2-(2′-thiazolin-2′-yl)-benzimidazole.

9. A process in accordance with claim 7 wherein the catalyst system concentration is from about 4 to about 6% by weight of the 2-(2′-thiazolin-2′-yl)-benzimidazole.

10. A process in accordance with claim 7 wherein the catalyst system consists of palladium-on-charcoal, the concentration of the catalyst system being about 5% by weight of the 2-(2′-thiazolin-2′-yl)-benzimidazole.

References Cited

UNITED STATES PATENTS 2,870,158   1/1959   Asinger et al. _____ 260—302

OTHER REFERENCES

Emmett: Catalysis II, Reinhold, 1955, pp. 24–25.
Sabatier: Catalysis in Organic Chemistry, Van Nostrand, 1922, pp. 89–103.

R. J. GALLAGHER, Primary Examiner
ALEX MAZEL, Assistant Examiner

U.S. Cl. X.R.
260—306.7, 309.2, 579, 999